United States Patent
Sendan et al.

(10) Patent No.: US 11,845,847 B2
(45) Date of Patent: Dec. 19, 2023

(54) SHAPING POWDER

(71) Applicant: DAIKIN INDUSTRIES, LTD., Osaka (JP)

(72) Inventors: Hiroyuki Sendan, Osaka (JP); Tadahiro Yabu, Osaka (JP); Yukihiro Fukagawa, Osaka (JP); Kenta Murayama, Osaka (JP); Tomohiro Shiromaru, Osaka (JP); Toshio Miyatani, Osaka (JP); Masahiro Kondou, Osaka (JP); Hiroyuki Hamada, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 395 days.

(21) Appl. No.: 16/954,772

(22) PCT Filed: Sep. 6, 2018

(86) PCT No.: PCT/JP2018/032995
§ 371 (c)(1),
(2) Date: Jun. 17, 2020

(87) PCT Pub. No.: WO2019/146151
PCT Pub. Date: Aug. 1, 2019

(65) Prior Publication Data
US 2021/0087354 A1    Mar. 25, 2021

(30) Foreign Application Priority Data

Jan. 23, 2018    (JP) .................................. 2018-008631

(51) Int. Cl.
*C08K 3/36* (2006.01)
*B33Y 70/10* (2020.01)

(52) U.S. Cl.
CPC ................ *C08K 3/36* (2013.01); *B33Y 70/10* (2020.01)

(58) Field of Classification Search
CPC .................................. C08K 3/36; B33Y 70/10
USPC ........................................................ 524/588
See application file for complete search history.

(56) References Cited

U.S. PATENT DOCUMENTS

| 2015/0030857 A1* | 1/2015 | Shigenai | .............. | C09D 127/18 |
| | | | | 524/514 |
| 2015/0307685 A1* | 10/2015 | Pham | .................... | B32B 27/304 |
| | | | | 428/206 |
| 2017/0028632 A1 | 2/2017 | Cox et al. | | |
| 2017/0130009 A1 | 5/2017 | Hosoda et al. | | |
| 2019/0031908 A1 | 1/2019 | Louis et al. | | |
| 2020/0024409 A1* | 1/2020 | Takeyama | ................ | C08J 3/005 |

FOREIGN PATENT DOCUMENTS

| CN | 106170506 A | 11/2016 | |
| EP | 2 832 771 A1 | 2/2015 | |
| JP | 2000-290409 A | 10/2000 | |
| JP | 2000290409 A | * 10/2000 | |
| JP | 2006-508217 A | 3/2006 | |
| JP | 2015-182435 A | 10/2015 | |
| JP | 2016-000862 A | 1/2016 | |
| JP | 2017-007221 A | 1/2017 | |
| JP | 2018190831 A | * 11/2018 | |
| WO | 2004/050746 A1 | 6/2004 | |
| WO | 2004/054625 A2 | 7/2004 | |
| WO | 2007/133912 A2 | 11/2007 | |
| WO | WO-2007133912 A2 | * 11/2007 | ........... B29C 64/153 |
| WO | 2016/017801 A1 | 2/2016 | |
| WO | 2016/209870 A1 | 12/2016 | |
| WO | 2017/040893 A1 | 3/2017 | |
| WO | 2017/113180 A1 | 7/2017 | |
| WO | 2017/153290 A1 | 9/2017 | |

OTHER PUBLICATIONS

International Search Report for PCT/JP2018/032995, dated Oct. 9, 2018.
International Preliminary Report on Patentability dated Jul. 28, 2020 together with a translation of the Written Opinion of the ISA from the International Bureau in International Application No. PCT/JP2018/032995.
Institute of Science and Technology Information of Ministry of Chemical Industries, "Encyclopedia of Industrial Chemical Auxiliaries", Feb. 1990, vol. 2, p. 268 (3 pages total).
China Building Materials Industry Press, "Metallic Material Coating Workers", edited by Wang Song, May 2011, p. 388 (7 pages total).
"Daikin NEOFLON NC-1500 FEP Coating Powder, White", SONGHAN Plastic Technology Co., Ltd., <URL:http://www.lookpolymers.com/pdf/Daikin-NEOFLON-NC-1500-FEP-Coating-Powder-White.pdf>, Jan. 1, 1999, XP055828528, (1 pages total).
"Asahi Glass Fluon G163 PTFE Granular Powder", SONGHAN Plastic Technology Co., Ltd., <URL:http://www.lookpolymers.com/Asahi-Glass-Fluon-G163-PTFE-Granular-Powder.pdf> Jan. 1, 1999, XP055828519 ( 1 page total).
Communication dated Aug. 9, 2021, from the European Patent Office in application No. 18902030.8.
Communication (Extended European Search Report) dated Jul. 6, 2023 from the European Patent Office in application No. 23170693.8.

\* cited by examiner

*Primary Examiner* — Kelechi C Egwim
(74) *Attorney, Agent, or Firm* — Sughrue Mion, PLLC

(57) ABSTRACT

A shaping material for a powder bed fusion method, containing a powder of a fluororesin.

5 Claims, 1 Drawing Sheet

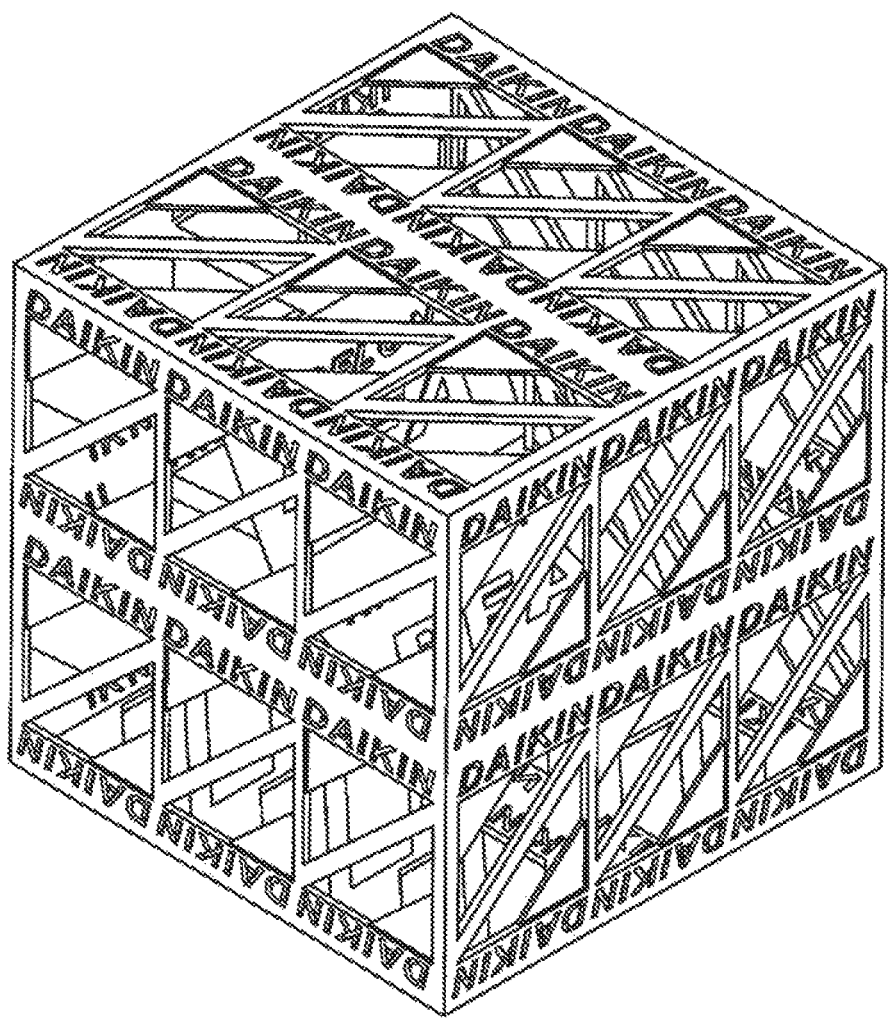

SHAPING POWDER

CROSS REFERENCE TO RELATED APPLICATIONS

This application is a National Stage of International Application No. PCT/JP2018/032995 filed Sep. 6, 2018, claiming priority based on Japanese Patent Application No. 2018-008631 filed Jan. 23, 2018.

TECHNICAL FIELD

The present disclosure relates to a three-dimensionally shaping powder, and particularly relates to a shaping powder which is used in a powder bed fusion method.

BACKGROUND ART

In recent years, an interest in a three-dimensionally shaping apparatus, a so-called 3D printer, has increased as a technique of shaping a three-dimensional structure. As a system regarding three-dimensional shaping, for example, a vat photopolymerization method of performing shaping by irradiating a monomer of a photocurable resin in a vat with light, a material extrusion method of performing shaping by extruding a flowable material from a nozzle to stack the flowable material, a binder injection method of performing shaping by injecting a binder into a powder material to bind the powder material, an inkjet method of performing shaping by injecting a liquid resin and curing the injected liquid resin, and a powder bed fusion method of performing shaping by irradiating a powder material with an energy ray to fuse and cure or sinter the powder material selectively, and the like are known. Among others, an interest in the powder bed fusion method has increased in recent years.

Shaping by the above-described powder bed fusion method is generally performed in such a way that a powder material stored in a powder material storage container is pushed and taken out with a recoater and is carried onto a shaping stand to form a thin layer of the powder material, and this thin layer is irradiated with an energy ray to perform fusion. By repeating this operation, a three-dimensional structure is shaped. A production method and a production apparatus using such a powder bed fusion method are described in, for example, Patent Literature 1.

CITATION LIST

Patent Literature

Patent Literature 1: Japanese Patent Laid-Open No. 2017-007221

SUMMARY OF INVENTION

Technical Problem

A shaping material may be one of various materials, such as general-purpose plastics and metals, in the powder bed fusion method, but a fluororesin has not been used as a shaping material. However, the fluororesin is light in weight and is excellent in heat resistance and chemical resistance, and therefore a three-dimensional structure which is shaped from a fluororesin is very useful in various fields, especially in the fields of automobiles, airplanes, and rockets.

Accordingly, an object of the present disclosure is to provide a shaping material for a powder bed fusion method which is used for shaping a three-dimensional structure of a fluororesin.

Solution to Problem

The present disclosure includes the following embodiments.

1. A shaping material for a powder bed fusion method, comprising a powder of a fluororesin.
2. The shaping material according to embodiment 1, wherein the powder of the fluororesin has a static bulk density of 0.3 g/ml or more and 1.5 g/ml or less.
3. The shaping material according to embodiment 1 or 2, wherein the powder of the fluororesin has a particle diameter of 10 μm or more and 300 μm or less in terms of D50.
4. The shaping material according to any one of embodiments 1 to 3, wherein the powder of the fluororesin has a Hausner ratio of 1.10 or more and 1.30 or less.
5. The shaping material according to any one of embodiments 1 to 4, wherein the powder of the fluororesin has a sphericity of 0.60 or more.
6. The shaping material according to any one of embodiments 1 to 5, wherein the powder of the fluororesin has a sphericity of 0.70 or more and 0.95 or less.
7. The shaping material according to any one of embodiments 1 to 6, wherein the fluororesin is a tetrafluoroethylene-perfluoroalkoxyethylene copolymer, a tetrafluoroethylene-hexafluoropropylene copolymer, or an ethylene-tetrafluoroethylene copolymer.
8. The shaping material according to any one of embodiments 1 to 7, further comprising a silica particle.

Advantageous Effects of Invention

According to the present disclosure, by using a shaping material containing a powder of a fluororesin, a three-dimensional structure of a fluororesin may be formed by a powder bed fusion method.

BRIEF DESCRIPTION OF DRAWINGS

The FIGURE is a perspective view of a molded body made in Examples.

DESCRIPTION OF EMBODIMENTS

Hereinafter, a shaping material of the present disclosure will be described.

A fluororesin contained in the shaping material of the present disclosure is not limited as long as it is a fluororesin that may be used in a powder bed fusion method, that is a fusible fluororesin. The fluororesin may be preferably a thermoplastic fluororesin that is fusible with an energy ray including, for example, various types of lasers, such as, for example, $CO_2$ laser, fiber laser, and YAG laser, and is preferably $CO_2$ laser.

Examples of the fluororesin include, as a fluorine-containing olefin unit, one, or two or more of a tetrafluoroethylene (TFE) unit, a chlorotrifluoroethylene (CTFE) unit, a vinyl fluoride (VF) unit, a vinylidene fluoride (VDF) unit, a hexafluoropropylene (HFP) unit, a trifluoroethylene (TrFE) unit, a perfluoro(alkyl vinyl ether) (PAVE) unit, and fluorine-containing dioxoles. In one embodiment, examples of the PAVE unit include a perfluoromethyl vinyl ether unit, and a perfluoropropyl vinyl ether unit. In addition, examples of fluorine-free olefin units include a hydrocarbon-based monomer having reactivity with the above-described fluoroolefins. The hydrocarbon-based monomer is preferably at least one fluorine-free olefin unit selected from the group consisting of, for example, alkenes, alkyl vinyl ethers, vinyl esters, alkyl allyl ethers, and alkyl allyl esters.

In one embodiment, examples of the fluororesin include a tetrafluoroethylene-perfluoroalkoxyethylene copolymer (PFA), a tetrafluoroethylene-hexafluoropropylene copolymer (FEP), an ethylene-tetrafluoroethylene copolymer (ETFE), Neoflon EFEP (R) a tetrafluoroethylene-hexafluoropropylene-perfluoro(alkyl vinyl ether) copolymer (PAVE), polychlorotrifluoroethylene (PCTFE), a chlorotrifluoroethylene-tetrafluoroethylene copolymer, an ethylene-chlorotrifluoroethylene copolymer, a tetrafluoroethylene-vinylidene fluoride copolymer, a vinylidene fluoride-hexafluoropropylene-tetrafluoroethylene copolymer, and a vinylidene fluoride-hexafluoropropylene-copolymer. These fluororesins may be used alone or as a mixture of two or more thereof.

In a preferred embodiment, the fluororesin can be, for example, a tetrafluoroethylene-perfluoroalkoxyethylene copolymer (PFA), a tetrafluoroethylene-hexafluoropropylene copolymer (FEP) or an ethylene-tetrafluoroethylene copolymer (ETFE). These fluororesins may be used alone or as a mixture two or more thereof. These fluororesins are preferably used alone.

In one embodiment, the number average molecular weight of the fluororesin is not limited, and may be, for example, 100,000 or more and 10,000,000 or less, preferably 500,000 or more and 500 or less. In a preferred embodiment, the shaping material of the present disclosure may be used in a powder bed fusion method, and therefore the fluororesin may have a relatively low molecular weight of, for example, 3,000,000 or less, 2,000,000 or less, or 1,000,000 or less. By using a low-molecular-weight fluororesin, the mechanical strength of a shaped three-dimensional structure is improved.

In the present disclosure, the above-described fluororesin is contained in the shaping material as a powder.

The present inventors have conducted studies on a shaping material containing the above-described fluororesin and have noticed that to enhance shapability more, it is effective to make a thin layer which is formed with a recoater more uniform and to enhance the recoatability of a powder of the fluororesin on a shaping stand. The recoatability of the shaping material can be changed by changing a property of the powder of the fluororesin, such as, for example, fluidity. For example, by enhancing the fluidity of the powder of the fluororesin, the recoatability of the shaping material can be enhanced.

In one embodiment, the particle diameter of the powder of the fluororesin may be preferably 10 µm or more and 300 µm or less, more preferably 20 µm or more and 250 µm or less, still more preferably 30 µm or more and 250 µm or less, and further still more preferably 40 µm or more and 150 µm or less in terms of D50. By setting the particle diameter (D50) of the fluororesin to 10 µm or more, the fluidity of the shaping material is improved, making it easy to form a uniform thin layer. By setting the particle diameter (D50) of the fluororesin to be larger, the fluidity of the shaping material can be enhanced more. In addition, setting the particle diameter (D50) of the fluororesin to 300 µm or less makes it easy to obtain a smooth surface on a shaped three-dimensional structure. By setting the particle diameter (D50) of the fluororesin to be smaller, a smoother surface can be obtained on a three-dimensional structure.

In one embodiment, the particle diameter of the powder of the fluororesin can preferably be 3 µm or more and 100 µm or less, more preferably 10 µm or more and 5 µm or less, and still more preferably 20 µm or more and 50 µm or less in terms of D10. By setting the particle diameter (D10) of the fluororesin to 3 µm or more, the fluidity of the shaping material is improved, making it easy to form a uniform thin layer. By setting the particle diameter (D10) of the fluororesin to be larger, the fluidity of the shaping material may be enhanced more. In addition, setting the diameter (D10) of the fluororesin to 100 µm or less, the fluidity of the shaping material is improved, making it easy to form a uniform thin layer. By setting the particle diameter (D10) of the fluororesin to be larger, the fluidity of the shaping material can be enhanced more. In addition, setting the particle diameter (D10) of the fluororesin to 100 µm or less makes it easy to obtain a smooth surface on a shaped three-dimensional structure. By setting the particle diameter (D10) of the fluororesin to be smaller, a smoother surface can be obtained on a three-dimensional structure.

In one embodiment, the particle diameter of the powder of the fluororesin can preferably be 30 µm or more and 800 µm or less, more preferably 50 µm or more and 600 µm or less, and still more preferably 80 µm or more and 500 µm or less, for example, 80 µm or more and 300 µm or less, or 80 µm or more and 200 µm or less in terms of D90. By setting the particle diameter (D90) of the fluororesin to 30 µm or more, the fluidity of the shaping material is improved, making it easy to form a uniform thin layer. By setting the particle diameter (D90) of the fluororesin to be larger, the fluidity of the shaping material can be enhanced more. In addition, setting the particle diameter (D90) of the fluororesin to 800 µm or less makes it easy to obtain a smooth surface on a shaped three-dimensional structure. By setting the particle diameter (D90) of the fluororesin to be smaller, a smoother surface can be obtained on a three-dimensional structure.

In a preferred embodiment, the particle diameter of the powder of the fluororesin may be preferably 10 µm or more and 300 µm or less, more preferably 20 µm or more and 250 µm or less, still more preferably 30 µm or more and 250 µm or less, and further still more preferably 40 µm or more and 150 µm or less in terms of D50; may be preferably 3 µm or more and 100 µm or less, more preferably 10 µm or more and 50 µm or less, and still more preferably 20 µm or more and 50 µm or less in terms of D10; and may be preferably 30 µm or more and 800 µm or less, more preferably 50 µm or more and 600 µm or less, and still more preferably 80 µm or more and 500 µm or less, for example 80 µm or more and 300 µm or less, or 80 µm or more and 200 µm or less in terms of D90.

The "D10", "D50", and "D90" herein refer to so-called volume accumulated particle diameters, and refer to particle diameters where cumulative values are 10%, 50%, and 90% respectively when they are arranged from smallest in a cumulative curve assuming the whole volume to be 100% in a particle size distribution determined on a volume basis. In the present disclosure, the particle diameters are measured by a laser diffraction method.

In one embodiment, the static bulk density of the powder of the fluororesin may be preferably 0.3 g/ml or more and 1.5 g/ml or less, more preferably 0.5 g/ml or more and 1.0 g/ml or less. By setting the static bulk density of the powder of the fluororesin to 0.3 g/ml or more, a volume change that occurs when the fluororesin is fused to be shaped can be made small. By setting the static bulk density of the fluororesin to be larger, the volume change can be made smaller. In addition, by setting the static bulk density of the powder of the fluororesin to 1.0 g/ml or less, the fluidity of the shaping material is improved, making it easy to form a uniform thin layer. By setting the static bulk density of the fluororesin to be smaller, the fluidity of the shaping material can be enhanced more. It is to be noted that in the present disclosure, the static bulk density is measured by the method described in JIS K6891.

In one embodiment, the Hausner ratio of the powder of the fluororesin may be preferably 1.10 or more and 1.30 or less, more preferably 1.20 or more and 1.25 or less. By setting the Hausner ratio of the powder of the fluororesin to be within the range, the fluidity of the shaping material is improved, making it easy to form a uniform thin layer. The "Hausner ratio" herein refers to a ratio represented by tapped density/static bulk density. It is to be noted that the Hausner ratio in the present disclosure is measured with a powder tester (manufactured by HOSOKAWA MICRON CORPORATION).

In one embodiment, the sphericity of the powder of the fluororesin may be preferably 0.60 or more, more preferably 0.60 or more and 0.98 or less, still more preferably 0.70 or more and 0.95 or less, and further still more preferably 0.80 or more and 0.95 or less. By setting the sphericity of the powder of the fluororesin to be within the range, the fluidity of the shaping material is improved, making it easy to form a uniform thin layer. The "sphericity" herein refers to deviation of the powder from a sphere, and refers to an average value of a ratio of the maximum diameter of each particle to the short diameter that is orthogonal to the maximum diameter (maximum diameter/shorter diameter) for arbitrary 50 particles in a photographic projection obtained by taking a photograph with a transmission electron microscope. The powder gets closer to a sphere as the sphericity gets closer to 1.

The powder of the fluororesin which is used in the present disclosure is not limited, and may be produced by, for example, a method including the followings.

Polymerizing a fluorine-containing ethylenic monomer by suspension polymerization, thereby obtaining a powder of a fluorine-containing polymer as polymerized,
    optionally increasing the density of the powder as polymerized with a roll under a condition capable of obtaining a specific gravity of 90% or more of true specific gravity, thereby obtaining a pulverized powder,
    placing the powder as polymerized or the pulverized powder into a friction type mill,
    processing the powder as polymerized or the pulverized powder into a desired shape, and
    collecting a fluorine-containing polymer powder from the friction type mill.

The fluorine-containing polymer powder which is obtained by the above-described production method has been processed into a desired shape with a friction type mill and therefore has a spherical shape and a high static bulk density. The production method is more excellent in productivity than a conventional method, and therefore a powder particle having a high static bulk density may be obtained in a highly efficient manner.

Friction Type Mill

The friction type mill is an apparatus such that a plurality of vanes is arranged at an outer circumferential portion of a rotary shaft inside a drum, and a powder is fluidized in the drum by the rotating of these vanes to cause centrifugal diffusion and vortex flow actions. The powder is received to mechanical stress by being pressed to an inner wall of the apparatus. A stirring member having a function of feeding and returning the powder to and from a rotational shaft direction may be operated. It is preferable to perform processing at a temperature of the fluorine-containing polymer powder in a range of 50 to 200° C.

Further, the friction type mill is preferably a friction type mill whose specifications are such that: the mill includes a rotor provided with a plurality of blades at the outer circumference thereof, and a casing provided with a cylindrical inner circumferential surface adjacent to tip portions in the radial directions of the blades; the blades adjacent to each other along the shaft center direction of the rotor are each extended toward a different direction from the shaft center; and at least one pair of blades adjacent to each other along the shaft center are each inclined in a reverse direction to the shaft center. Such an apparatus, for example, an apparatus described in Japanese Patent Laid-Open No. 2010-180099 can be used.

In an apparatus having such specifications, large compressive force and shear force are applied to the powder between the tip portions in the radial directions of a plurality of blades and the inner circumferential surface of the casing, so that a powder having a high static bulk density can effectively be produced.

Examples of such an apparatus include NOBILTA manufactured by HOSOKAWA MICRON CORPORATION.

The shaping material of the present disclosure may contain an additional material other than the powder of the fluororesin.

Examples of the additional material include shaping auxiliaries, such as, for example, a silica ($SiO_2$) glass fiber, a carbon fiber, graphite, a carbon nanotube, a carbon nanohorn, fullerene, aluminum oxide, clay, montmorillonite, and talc. By adding a shaping auxiliary, especially silica, to the shaping material of the present disclosure, the fluidity and shapability of the shaping material are improved.

The content of the silica may be preferably 0.1% by weight or more and 1.0% by weight or less, more preferably 0.1% by weight or more and 0.5% by weight or less, and still more preferably 0.1% by weight or more and 0.3% by weight or less based on the whole amount of the shaping material. By setting the content of silica to 0.1% by weight or more, the fluidity and shapability of the shaping material are improved. By setting the content of silica to be larger, the fluidity and shapability of the shaping material are improved more. In addition, by setting the content of silica to 1.0% by weight or less, the content of the fluororesin can sufficiently be secured, so that the characteristics of the fluororesin can sufficiently be exhibited in a three-dimensional structure.

The silica preferably has a particle diameter equivalent to the particle diameter of the fluororesin.

Examples of other additional materials include a laser-absorbing colorant. The laser-absorbing colorant is not limited as long as it is a material that can absorb laser light having a wavelength of around 1 μm, and may be carbon, a metal, a pigment, a dye, and the like. Preferably, carbon is used as a main component. The laser-absorbing colorant preferably has an average particle diameter of about 10 μm and has a particle diameter range of 2 μm or more and 40 μm or less. The content of the laser-absorbing colorant in the shaping material is preferably in a range of, for example, 0.05% by weight or more and 0.20% by weight or less.

In one embodiment, the particle diameter of the silica may be preferably 10 μm or more and 300 μm or less, more preferably 20 μm or more and 250 μm or less, still more preferably 30 μm or more and 250 μm or less, and further still more preferably 40 μm or more and 150 μm or less in terms of D50.

In a preferred embodiment, the shaping material of the present disclosure may be a mixture of PFA and silica.

Next, a method of shaping the shaping material of the present invention, the method using a powder bed fusion method, will be described.

A shaping apparatus using a powder bed fusion method is generally provided with a powder storage container that stores a shaping material on both sides of a shaping stand where shaping is performed. The shaping apparatus is further provided with: a recoater that supplies the shaping material in the powder storage container to the shaping stand to form a thin layer; and a laser unit by which the thin layer is irradiated with laser.

Firstly, the shaping material in a necessary amount is stored in the powder storage container. Subsequently, the shaping stand is lowered by the height corresponding to the thickness of the thin layer. On the other hand, the bottom of the powder storage container is lifted to put an appropriate amount of the shaping material up above the powder storage container. This shaping material is carried onto the shaping stand by the recoater, and the recoater is moved in such a way as to scrape on the surface, thereby forming a thin layer on the shaping stand. Subsequently, the powder is cured by scanning laser light based on a slice data of a three-dimensional structure to be shaped and fusing the thin layer. By repeating this operation, layers corresponding to the slice data are formed sequentially, and thus the three-dimensional structure is shaped.

Preferably, the temperature of the powder in the powder storage container which is a supply area and the temperature of the powder on the shaping stand which is a shaping area are controlled appropriately in shaping according to the shaping material to be used. By controlling such temperatures, a more uniform thin layer can be formed, and moreover, performing more precise shaping is enabled.

EXAMPLES

As fluororesins, the powders of PFA, FEP, ETFE, and EFEP were prepared. The characteristics of each powder are shown in Table 1 below.

TABLE 1

|  |  | PFA | FEP | ETFE | EFEP |
|---|---|---|---|---|---|
| Static bulk density (g/ml) |  | 0.8 | 0.9 | 0.9 | 0.6 |
| Particle size | D50 | 22 | 15 | 220 | 36 |
| distribution | D10 | 12 | 8 | 25 | 11 |
| (nm) | D90 | 50 | 47 | 420 | 100 |
| Melting point (° C.) |  | 300 | 257 | 220 | 164 |

Examples 1 to 6

The powders of the fluororesins, and the mixtures of the powder of the fluororesin and the silica powder, as shown in the table below, were each made into samples (the minimum thickness of the walls was 0.8 mm), as shown in the FIGURE, each being a hollow cube having a length of one side of 60 mm, the hollow cube including inside thereof a hollow cube having a length of one side of 30 mm, using a powder bed fusion type 3D printer. The fluororesins used, and in the case of containing silica, the contents of the silica are shown in Table 2 below. In addition, the temperatures of the supply area and the shaping area at the time of shaping are shown together in Table 2.

TABLE 2

|  | Fluororesin | Silica | Supply area | Shaping area |
|---|---|---|---|---|
| Example 1 | PFA | — | 230° C. | 280° C. |
| Example 2 | FEP | — | 200° C. | 200° C. |
| Example 3 | ETFE | — | 180° C. | 200° C. |
| Example 4 | EFEP | — | 120° C. | 140° C. |
| Example 5 | PFA | 0.3% by weight | 230° C. | 270° C. |
| Example 6 | FEP | 0.3% by weight | 200° C. | 230° C. |

The above-described test results demonstrates that shaping can be performed in any of the Examples. However, a slight bend is observed in Example 1, and roughness was observed on the surface in Examples 2 and 4. A clean sample was shaped in Example 5 in particular.

INDUSTRIAL APPLICABILITY

The shaping material of the present disclosure can suitably be utilized for shaping various products, especially for shaping by a powder bed fusion method.

The invention claimed is:

1. A shaping material for a powder bed fusion method, comprising a powder of a fluororesin,
    wherein the powder of the fluororesin has a particle diameter of 10 μm or more and 300 μm or less in terms of D50, a particle diameter of 3 μm or more and 100 μm or less in terms of D10, and a particle diameter of 30 μm or more and 800 μm or less in terms of D90,
    the powder of the fluororesin has a sphericity of 0.60 or more, and
    the powder of the fluororesin has a static bulk density of 0.3 g/ml or more and 1.5 g/ml or less.

2. The shaping material according to claim 1, wherein the powder of the fluororesin has a Hausner ratio of 1.10 or more and 1.30 or less.

3. The shaping material according to claim 1, wherein the powder of the fluororesin has a sphericity of 0.70 or more and 0.95 or less.

4. The shaping material according to claim 1, wherein the fluororesin is a tetrafluoroethylene-perfluoroalkoxyethylene copolymer, a tetrafluoroethylene-hexafluoropropylene copolymer, or an ethylene-tetrafluoroethylene copolymer.

5. The shaping material according to claim 1, further comprising a silica particle.

* * * * *